RECEIVING AERIAL SYSTEMS

Filed April 12, 1956 3 Sheets-Sheet 1

INVENTOR:
Dennis Byatt
BY: Baldwin + Wight
ATTORNEYS

Sept. 20, 1960 D. BYATT 2,953,782

RECEIVING AERIAL SYSTEMS

Filed April 12, 1956 3 Sheets-Sheet 2

INVENTOR:

Dennis Byatt

BY: Baldwin & Wight
ATTORNEYS

Sept. 20, 1960 D. BYATT 2,953,782

RECEIVING AERIAL SYSTEMS

Filed April 12, 1956 3 Sheets-Sheet 3

INVENTOR:
Dennis Byatt
BY: Baldwin & Wight
ATTORNEYS 2,953,782

RECEIVING AERIAL SYSTEMS

Dennis Byatt, Chelmsford, England, assignor to Marconi's Wireless Telegraph Company Limited, London, England, a British company Filed Apr. 12, 1956, Ser. No. 577,866

Claims priority, application Great Britain May 4, 1955

7 Claims. (Cl. 343—118)

Figures 1, 2, 3:
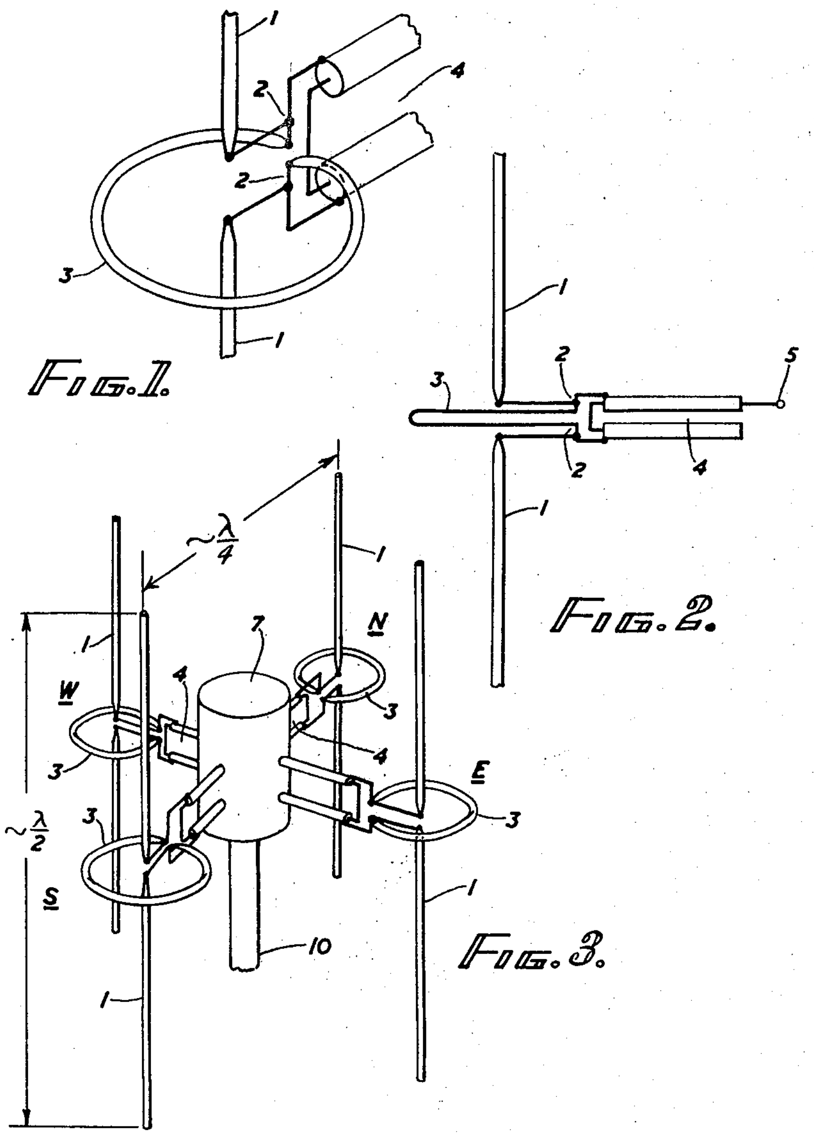

This invention relates to receiving aerial systems and in particular though not exclusively to receiving aerial systems for use in radio direction finders.

Present day direction-finding systems generally use aerials which are maximally responsive to incoming radio waves of one particular plane of polarization only. In usual practice this particular polarization is in either the horizontal or the vertical plane. Consequently those components of incoming waves having a polarization different from that of the aerial are largely, if not totally, wasted. Also, where stray incoming waves having a polarization different from that of the aerial, due to reflections, for example, or radiations coming from a strong transmitter, are received, they may give rise to signals of acceptable strength which cause incorrect directional indications and so-called "polarization errors" result.

Polarization error often occurs with very high frequency waves. When these frequencies are being used for direction-finding (D.F.) the aerials are normally situated several wavelengths above ground level. In this case, as is well known, horizontal and vertical polarization components of an incoming wave (no matter what the main polarization of the wave may be, both horizontal and vertical components will be present to some degree) tend to produce in the vertical polar diagram coincident lobes when the angle of incidence of said wave at the aerial is less than a certain value, usually between 6° and 10° above horizontal, and non-coincident lobes when the angle is greater than said value. This phenomenon may create excessive bearing errors in the readings given by a D.F. system particularly where the angle of incidence of incoming waves is large and the distance between the D.F. aerial and the transmitter is small, e.g. as is the case when direction finding is being effected at an airfield D.F. station which is receiving waves from a transmitter carried by an aircraft flying round the airfield preparatory to landing.

An important object of the present invention is to provide a radio receiving aerial system which has a good response to incoming waves of any plane polarization so that it shall be of general efficient utility for the reception of waves of any direction of plane polarization. Another important object is to provide a radio receiving aerial system for direction finding purposes which shall be substantially free from polarization error when so employed.

According to the main feature of the present invention a receiving aerial system includes in combination one aerial portion adapted maximally to receive waves of one plane of polarization, another aerial portion adapted maximally to receive waves of another plane of polarization (preferably and for best results at right angles to the first) means for producing in-phase signal components from the outputs of the two aerial portions and means for combining the in-phase signal components to provide a final output. By "in-phase signal components" as employed in the specification is meant such components of the two signals received by the two aerial portions which are in phase.

Preferably, one of the aerial portions is adapted maximally to receive horizontally polarized waves and the other maximally to receive vertically polarized waves.

A preferred form of radio direction finder in accordance with this invention comprises four receiving aerial systems in accordance with the main features of this invention each at one or other of the four corners of a square, and each having a substantially omnidirectional polar diagram, means for successively sampling the final outputs of said aerial systems and applying the samples to a common receiver, means for comparing the phase of the receiver output with that of a reference signal and means responsive to the phase comparison for indicating incoming signal direction.

Figure 4:
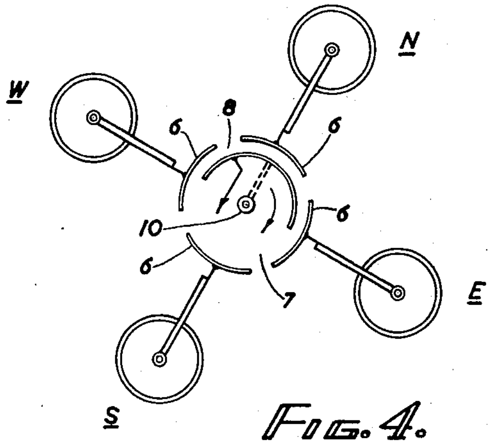
Figure 3:
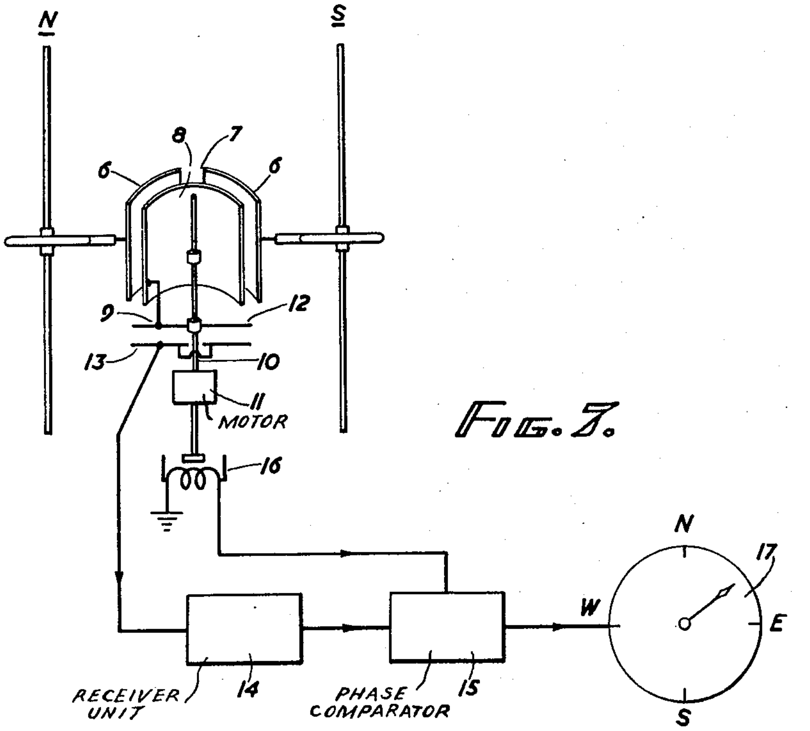
Figure 5:
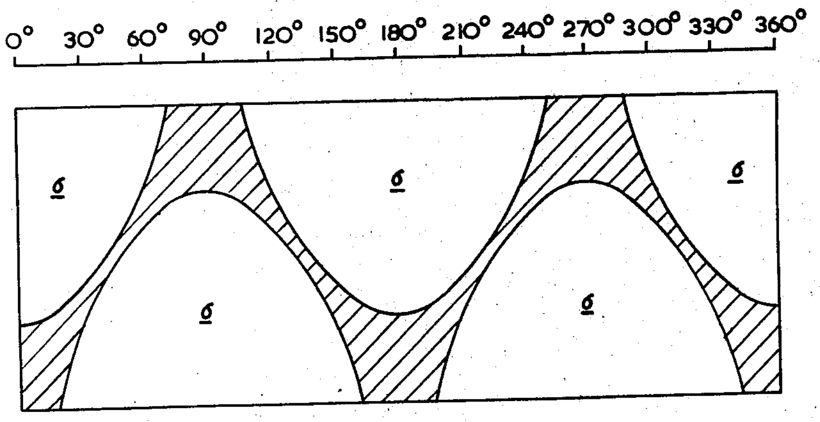
Figure 6:
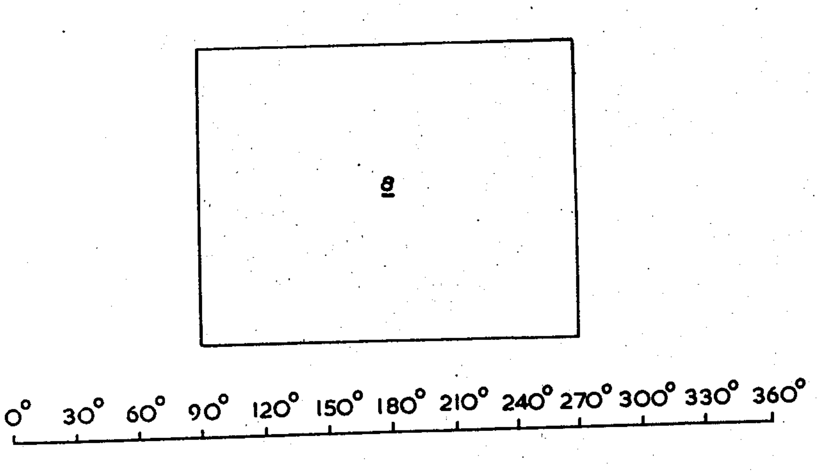

The invention is illustrated in the accompanying drawings, in which Figs. 1 and 2 show a perspective view and a side elevation respectively of one form of aerial system in accordance with the invention, Figs. 3 and 4 show a direction finding aerial system comprising four aerial systems as shown in Figs. 1 and 2, in perspective and plan respectively, Figs. 5 and 6 are developed views of the plates of a goniometer used in the arrangement of Figs. 3 and 4 and Fig. 7 is a simplified diagrammatic representation of the whole direction-finding system partly shown in Figs. 3 and 4. Throughout the drawings, like parts are denoted by like reference.

Referring to Figs. 1 and 2, a vertical dipole aerial portion 1, substantially of length $\lambda/2$ (where $\lambda$ is the wavelength) is connected in parallel at points 2 with a horizontal loop aerial 3. Dipole 1 is maximally responsive to the vertical electric component of incoming waves and loop 3 to the vertical magnetic component of said waves. A so-called "balun" (i.e. balance-to-unbalance) coaxial line transformer 4, well known per se, is connected between the points 2 and a final output point 5. The outputs of the individual aerial portions 1 and 3 will combine to produce an in-phase signal and this is passed through the balun 4 to provide a final output. The amplitude of this signal will, at any instant, be as great as or greater than that of the signal from either of the individual aerial portions alone.

Preferably loop 3 is screened. In an installation as shown in Figs. 1 and 2 and which was developed for use at 100 mc./s., the capacitance was 5 micro-microfarads, the loop had a mean diameter of approximately 20 cms. and the dipole an overall length of approximately 150 cms., i.e. $\lambda/2$. This unit was found to have a good response to incoming waves having any plane of polarization. It was substantially free from polarization error, no matter what angle the incoming waves were incident.

Referring now to Figs. 3 and 4 there are four aerial systems N, E, S and W, each as shown in Figs. 1 and 2 respectively, situated at the four corners of a square and so spaced that diametrically opposite dipoles are substantially $\lambda/4$ apart. The outputs of the balun transformers 4 are taken each to a separate static plate 6 of a D.F. goniometer generally designated 7. These plates 6 lie on the curved vertical surface of an imaginary vertical cylinder. An arcuate rotor plate 8 carried by a radial arm attached to a shaft 10, at the axis of the imaginary cylinder, is rotated within the ring of plates 6, about the central axis of said cylinder, rotation being effected by suitable continuously running driving means (not shown).

Fig. 5 shows a developed view of the plates 6 (the plates are unshaded, the shading representing supporting insulation) with a scale of angles marked on the diagram. As will be seen the plates are so shaped that, in the developed view, each has a boundary consisting of a substantially sinusoidal wave on a straight base extending over an angle of almost 180°, adjacent plates being upside down with respect to one another, two of the bases being in one straight line and the other two being in a parallel straight line (in developed view of course). Fig. 6 is a developed view of the rotor plate 8 to the same scale. As will be seen the plate extends over substantially 180°. With this arrangement of goniometer, rotor plate 8 is in capacity coupling relationship with at least three of the fixed plates 6 at any instant during rotation.

In the arrangement shown in Figs. 3 and 4, the output from rotor 8 will consist of the received R.F. wave, sinusoidally modulated (due to the shapes of the goniometer plates) at a frequency which is a function of the speed of rotation of the rotor plate 8. The phase of the modulated wave on rotor 8 will depend upon the phase difference between the outputs of the aerial systems at the corners of the square N, E, S, W, and this in turn will depend on the incoming signal direction.

An apparatus as so far described may be used in conjunction with any of a well known number of receiving circuits and for the sake of completeness one such circuit will now be described with reference to Fig. 7 in which, to preserve clarity, only one pair of diametrically opposite, aerial systems N and S and the goniometer 7 are shown. The goniometer rotor is rotated by a motor 11 connected to the driving shaft 10. Also driven by shaft 10 is a rotor plate 12 of a capacity coupling condenser. Plate 8 of the goniometer is electrically connected at 9 to plate 12. The stator plate 13 of the capacity coupling condenser lies parallel to the rotating plate 12 and is connected to a receiver unit 14 the detected output of which is fed to a phase comparator 15 to which is also fed the sinusoidal output from a reference generator 16, also driven by motor 11 and shown conventionally as of the inductor type. The phase comparator is of any well known type adapted to give a D.C. voltage output whose amplitude and polarity are respectively representative of the extent and sign of the phase difference between the two inputs thereto. If this voltage, therefore, is applied to a meter, such as the meter represented diagrammatically at 17, and which reads over a scale of voltages extending from a suitable maximum positive voltage through zero to a suitable maximum negative voltage, the meter may be calibrated to indicate incoming signal directions directly.

I claim:

1. A receiver aerial system comprising in combination a plurality of combined pairs of aerials, each combined pair comprising one aerial portion which is maximally responsive to received waves of one plane of polarization and a dipole aerial portion which is maximally responsive to received waves of another plane of polarization, said dipole aerial being positioned axially with respect to said loop aerial portion, the aerial portions in each combined pair being connected in parallel at the common point of location, means to combine the outputs of each aerial of said pairs whereby in-phase signal components are produced from each combined pair and means to combine the in-phase signal components in a geometrical manner from the plurality of combined pairs of aerials to provide a final output.

2. An aerial system as set forth in claim 1 wherein the aerial portions are respectively adapted maximally to receive waves whose planes of polarization are mutually perpendicular.

3. An aerial system according to claim 1, wherein each dipole is symmetrically positioned with respect to the loop aerial of the pair, and wherein the means to combine the outputs of each aerial of said pairs includes a connection between the inner ends of the halves of the dipole and the ends of the loop.

4. An aerial system according to claim 1, wherein the means to combine the outputs of each aerial of said pairs includes connections between the ends of the halves of the dipole and the ends of the loop.

5. In combination in a direction finder, four similar combined pairs of aerial portions, each combined pair comprising one aerial portion which is maximally responsive to received waves of one plane of polarization and another aerial portion which is maximally responsive to received waves of another plane of polarization, the aerial portions in each combined pair being connected in parallel, means to combine the outputs of each aerial of said pairs whereby in-phase signal components are produced from each combined pair, each of said combined pairs being arranged at the corners of a square, and so spaced that diametrically opposite pairs are substantially an odd number, including unity, of quarter wave lengths apart, a goniometer having four input terminals fed each from a different one of said combined pairs of aerials and a direction indicating receiver fed with output from said goniometer.

6. A direction finder as set forth in claim 5 wherein the goniometer is of the capacity type with four input plates spaced around a circle and an output plate adapted to be driven around the said circle in successive coupling relationship with the input plates.

7. A direction finder as set forth in claim 5 wherein the goniometer is of the capacity type with four input plates spaced around a circle and an output plate adapted to be driven around the said circle in successive coupling relationship with the input plates, and wherein the goniometer plates are shaped to provide substantially sinusoidal variation of coupling as the goniometer rotor rotates.

References Cited in the file of this patent

UNITED STATES PATENTS

| | | |
|---|---|---|
| 1,892,221 | Runge | Dec. 27, 1932 |
| 2,256,538 | Alford | Sept. 23, 1941 |
| 2,256,619 | Luck | Sept. 23, 1941 |
| 2,282,030 | Busignies | May 5, 1942 |
| 2,320,124 | Forbes | May 25, 1943 |
| 2,673,931 | Stevens | Mar. 30, 1954 |
| 2,695,406 | Byatt | Nov. 23, 1954 |